United States Patent [19]

Bailey

[11] 4,387,215

[45] Jun. 7, 1983

[54] POLYCYCLIC RING-OPENED POLYMERS

[76] Inventor: William J. Bailey, 6905 Pineway, University Park, Md. 20782

[21] Appl. No.: 187,249

[22] Filed: Sep. 15, 1980

Related U.S. Application Data

[63] Continuation of Ser. No. 346,374, Mar. 30, 1973, abandoned.

[51] Int. Cl.³ ............................................. C08G 67/00
[52] U.S. Cl. .................................. 528/354; 528/271; 528/355; 528/357; 528/359; 528/370; 528/371; 528/403; 528/408; 528/409; 528/425
[58] Field of Search ............... 528/220, 271, 354, 355, 528/357, 359, 370, 371, 403, 408, 409, 425

[56] References Cited

U.S. PATENT DOCUMENTS 3,013,252  1/1962  Schroeder .......................... 528/87
3,013,262  1/1962  Schroeder ......................... 260/29.2
4,119,579  10/1978  Capozza ............................ 528/425

*Primary Examiner*—Lester L. Lee

[57] ABSTRACT

This invention relates to the process and the product by process of the polymers formed by the polymerization of polycyclic ring-opening monomers. More particularly, this invention relates to the novel process and product by process of polymers that are produced with near zero shrinkage or expansion during polymerization and are immediately useful for production of strain-free composites, high strength adhesives, precision castings, binders for propellants and as additives to other monomer mixtures to produce a mixture that controls the amount of shrinkage or expansion upon polymerization.

20 Claims, No Drawings

POLYCYCLIC RING-OPENED POLYMERS

This is a continuation of application Ser. No. 346,374, filed Mar. 30, 1973, and now abandoned.

BACKGROUND OF THE INVENTION

1. Field of the Invention

This invention relates to the process and the product by process of the polymers formed by the polymerization of polycyclic ring-opening monomers. More particularly, this invention relates to the novel process and product by process of polymers that are produced with near zero shrinkage or expansion during polymerization and are immediately useful for production of strain-free composites, high strength adhesives, precision castings, binders for propellants and as additives to other monomer mixtures to product a mixture that controls the amount of shrinkage or expansion upon polymerization. The process and product by process of the present invention is also applicable to the production of polymers wherein the prior art practices involved serious factors of binding and shrinkage.

2. Description of the Prior Art

For a number of material applications, such as strain-free composites, high-strength adhesives, precision castings and binders for solid propellants, no satisfactory monomers were utilized in the prior art that will polymerize with near zero shrinkage or even slight expansion. Many composites involving high-strength fibers in a polymeric matrix fail because of either poor adhesion between the matrix and the fibers, because of voids or because of microcracks in the matrix. These problems are related to the fact that when available materials polymerize or cure, a pronounced shrinkage takes place. In bulk plastics, some of these stresses can be relieved only with a total shrinkage in the outer dimensions of the article. Moreover, in a composite, the reinforcing material, which has a high modulus, will often not permit appreciable shrinkage in the overall dimension of the molded object which then causes enormous stresses to be built up in the composite. These stresses are relieved either by an adhesive failure in which the matrix pulls away from the reinforcing fiber or by a cohesive failure in which a void or a microcrack is formed. The complete failure of suitable polymers in the prior art has prevented the formation of strain-free composites, high strength adhesives, precision castings, binders for solid propellants and autopressure casting, heretofore.

The shrinkage that occurs during polymerization has been assertained by the applicant to arise from the fact that in the monomer starting materials, utilized in the prior art for polymer production, the monomers are located at a Van der Waals' distance from one another while in the corresponding polymer, the monomeric units move to within a covalent distance of each other. Simply, the atoms are much closer to one another in the polymer than they were in the original monomer. Nichols, et al., [Ind. Eng. Chem., 42, 292 (1950)] has calculated the shrinkages for addition polymerizations and has found shrinkage ratios of from 34% for vinyl chloride to 6% for 1-vinylpyrene. The general trend found was the larger the monomer the smaller the shrinkage; that is, when the double bond is a relatively small portion of the molecule, the percent of shrinkage is much less. For this reason, the use of prepolymers were needed to reduce the actual shrinkages that occured during the final polymerization. The principle use of these addition polymers are in the form of thermoplastic molding powders wherein the shrinkage during polymerization is of little importance; and not in casting, wherein the shrinkage is a serious problem.

More drastically, in a condensation polymerization, the shrinkage is apt to be greater than that which occurs in many addition polymerizations since a small molecule is eliminated during the formation of the new bond. Thus, in addition to the shrinkage that takes place when the molecules make the transition from a Van der Waals' distance to a covalent distance, an additional shrinkage occurs because the volume occupied by the atoms of the small molecule is now vacant, resulting in a still further shrinkage. In phenolic resins where water is split out, shrinkage is such a termendous problem that very little molded material is made without the use of fillers, which give the final articles some dimensional stability, but produces enormous stresses to be built up in the composite, and which are only relieved by adhesive failure or by cohesive failure in which a void or microcrack is formed. De Boer [*Trans. Faraday Soc.*, 32, 10 (1936)] has calculated that if all the primary valence bonds are formed in a heat-hardened phenolic resin, the theoretical strength should be 4000 Kg/mm$^2$. Actually the usual strength of phenolic resins is about 8 Kg/mm$^2$, 1/500 of the expected strength. Applicant's invention seeks to remedy this long sought need.

In ring-opening polymerization, the shrinkage may be less since not only is a small molecule not eliminated during the polymerization reaction, but for every bond that goes from a Van der Waals' distance to a covalent distance another bond goes from a covalent distance to a near Van der Waals' distance.

The shrinkage ratios during ring-opening polymerization run from 23% for Ethylene oxide to 3% for 5-Oxa-1,2-dithiacycloheptane and 2% for the dimethylsilane oxide cyclic tetramer; with the general rule that as the ring that is opened gets larger, the shrinkage gets smaller; or the closer the monomer resembles the final polymer, the smaller the shrinkage. The prior art has shown no examples of polymerizations with essentially zero shrinkage or which expand during polymerization.

The only previous use of a polycyclic ring-opening compound in the polymer area is the use of spiro ortho esters as chain-degradation stoppers to prevent the decomposition of oxymethylene polymers (Japan '65 3708, Japan '69 28,111, Japan '67, 3496, Fr. 1,409,957). Normally oxymethylene when heated will revert back to formaldehyde by unzipping. The thrust of the Japaness patent was that by placing a group into the backbone which will change the mechanism of decomposition it will therefore prevent the decomposition from occuring. The spiro ortho ester was not used for its volume properties and, moreover, the claim was limited in its scope to a mixture containing less than 15% spiro ortho ester; the strongest proof that the volume properties of these compounds were unrecognizable in the art. The prior art has shown no examples of polymerizations with essentially zero shrinkage or which expand during polymerizations even though a long sought need has existed for precision casting materials and strain-free composite binders.

SUMMARY OF THE INVENTION

Applicant has disclosed that in polycyclic ring opening monomers, for every bond that goes from a Van der Waals' distance to a covalent distance, at least two bonds go from a covalent distance to a near Van der Waals' distance. This results in essentially zero shrinkage or expansion upon polymerization for these compounds.

Broadly, the use of this invention now allows the production of strain-free composites, high strength adhesives, precision castings, binders for solid propellants, to name just a few of its immediate applications.

This invention is a process of manufacturing polycyclic ring-opening polymers, the steps of which comprise: mixing together a polycyclic ring opening monomer with a polymerizing catalyst; and polymerizing the mixture.

Applicant has found that the compounds which undergo essential zero shrinkage or expansion on polymerization are the polycyclic ring opening monomers. These polycyclic ring-opening monomers contain a multiplicative ring system that undergoes polymer bond formation by the opening of more than one ring for each full polymer bond formed in the product. Specifically, applicant has found that these polycyclic ring-opening monomers open n + m ring systems, for m polymer bonds formed, and where n is greater than zero. Some examples of these polycyclic ring-opening monomers are (a) spiro ortho esters, (b) spiro orthocarbonates, and (c) polycyclo ketal lactones.

Examples of the typical polycyclic ring-opening reaction are as follows:

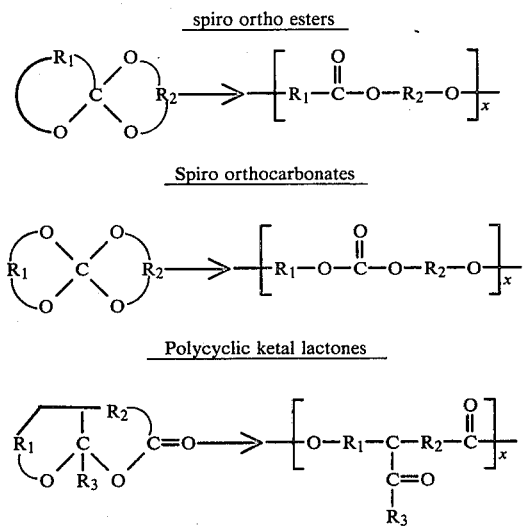

where in $R_1$, $R_2$ represent organic chains that make up the ring system and $R_3$ represents an organic radical selected from the group consisting of alkyl, aralkyl, bisalkyl, bisaralkyl, bishaloalkyl, and haloalkyl radicals. The above illustrations are given for the purposes of showing how more than one ring is broken for each full polymer bond formed during the polymerization of the polycyclic ring-opening monomers.

Applicants invention relates to the adhesive fields wherein for binding purposes a polycyclic ring-opening polymer offers unusual and superior qualities. The polymerizing material that is caught within the microcracks and valleys on the surface to be bound, will now expand during polymerization similar to the process that occurs during the freezing of water inside of these microcracks, pushing these apart and thereby gripping these surfaces analogous to a snap-fastener effect. Since many surfaces, including those of glass and carbon fibers are irregular in a simular manner, one obtains a great increase in the adhesive strength from a matrix that expands into the surface upon curing.

Prepolymers

By carrying out part of the shrinkage prior to addition to the mold, prepolymers were previously used in the prior art in an attempt to avoid the volume shrinkage problem that normally occurs during the polymerization process. Since polycyclic ring-opening monomers either have a low volume change or an expansion upon polymerization, the use of dissolved prepolymers in our monomer mix, or capped with polycyclic ring-opening units, now takes on a different light. Prepolymers are now recommended in the practice of this invention for the following attributes, described, herein. The use of prepolymers will increase the viscosity of the monomer mix and will thereby aid in the suspension of fillers, particles, fibers, wiskers, powders, flakes, platelets and propellants and will prevent the gravitational settlement of these particles during the polymerization step.

In addition, the use of prepolymers can be used to moderate the volume expansion. Furthermore, prepolymers are used when it is desired to reduce the total amount of heat and thermal effects which are produced during the polymerization process. This is especially true when propellants for rockets are used within the polymerization process. Since the rocket propellants, used as a polymer filler, could detonate or explode upon reaching a critical temperature, the use of a prepolymer mix would reduce the total over-all heat generated during the polymerization process, thereby allowing safer, faster and better casting to be made. Moreover, general prepolymers can be used to save costs. Polycyclic ring-opening monomers are presently expensive to produce and the use of cheaper prepolymers will lower the cost and increase the utility of this invention. Since this invention for the first time allows precision polymer casting to be accomplished, the economic advantages in using prepolymers cannot be underestimated.

Composites

The use of polymers as binders or as matrixes is well known in the art. The usual composites, containing particles, such as fillers, fibers, wiskers, powders, flakes, platelets and propellants, can be incorporated into any of the polycyclic ring-opening polymers produced according to the process described herein. The volume change, during the polymerization process, is decreased proportionately with respect to the increase in the proportion of the filler utilized in the monomer mix. When composites are produced containing reinforcing agents therein, it is found highly desireable for the monomer mixture to contain sufficient prepolymer therein, or a prepolymer capped with a polycyclic ring-opening unit, to increase the viscosity of the monomer solution. In those cases where the amount of reinforcing agent is low, this viscous prepolymer or prepolymer monomer mixture will then keep the particles, therein, uniformally suspended while undergoing polymerization and so will produce the highly desireable result of preventing the gravational settlement of the particles to the bottom of the polymerization container. The use of the viscous prepolymer polycyclic ring-opening monomer mixture is therefore an improvement over the prior art for the formation of uniform composites which are utilized for their strength or for their uniform burn rate.

In those composites wherein the amount of reinforcing agent is high, the over-all dimensions are restricted by the reinforcing agent. If shrinkage occurs during the polymerization of the monomer or prepolymer, the matrix either must undergo a cohesive failure which results in a microcrack or void, or an adhesive failure which results in a nonbonding between the matrix and the reinforcing agent.

Since the present invention includes materials with near zero volume change during final polymerization, cohesive or adhesive failures will be considerably reduced and will result in superior composites.

The usual pigments, plasticizers and resiliency agents, as known in the art, can be incorporated into the polycyclic ring-opening polymers as desired.

Cross-linking agents

The polycyclic ring-opening monomers can be uni or polyfunctional. The unifunctional polycyclic ring-opening monomers will produce linear polymers. These polymers will have improved adhesive and reproduction properties along with their coating and inpregnating capabilities. Polyfunctional polycyclic ring-opening monomers will produce cross-linked polymers that can be compounded in properties from rubbery, through resilient plastics to ultimately solid matrixes, depending upon the increased branching and cross-linking. Normally, the amount of cross-linking desired in the final product depends upon the use the final product will be called upon to perform. As the cross-linking in the final product becomes more pronounced, the final product becomes insoluble and more swell-resistant. The cross-linking agents that are conventionally used in the art can be added and used in applicant's invention as well as the polyfunctional polycyclic ring-opening monomers which can also act as cross-linking agents. The advantage of using the polyfunctional polycyclic ring-opening monomers in applicant's invention is that the cross-linking would be more uniform and random, since these cross-linking polyfunctional polycyclic ring-opening monomers have a high cross-over constant, as it is known in the art. This cross-over randomness aids in the structural strength of the polymer and produces a more uniform polymer or polymer composite. These cross-linked polymer are insoluble, hard, tough and resilient. These polycyclic ring-opening monomers can be added to other cross-linking agents to produce strain-free polymers that have near zero volume change.

Various embodiments of the invention are described in the following examples. It will be understood, however, that these examples are presented by way of illustration only and that it is not applicants intention to be limited thereby to the particular reagent or conditions or the conditions set forth therein.

EXAMPLE 1

Polymerization of the polycyclo ketal lactone by Boron trifluoride: 8-methyl-2-oxo-hexahydrofuro[2,3-b]furan was premelted and introduced into an 8.3-ml. dilatometer within a constant temperature bath (120°); 10 cc of boron trifluoride gas was injected into the dilatometer and the contents mixed. After this mixture was allowed to polymerize in the constant temperature bath at 120° for 48 hours, it produced a brown viscous polymer, [n]=0.12 at 25° in chloroform. There was no observable volume change during this polymerization process.

EXAMPLE 2

Polymerization of the polycyclo ketal lactone by sodium metal: A mixture of 8.3 ml. of premelted 8-methyl-2-oxo-hexahydrofuro[2,3-b]furan and 0.05 g of sodium metal was placed in an 8.3-ml. dilalometer within a constant temperature bath (200°) and the contents were mixed. After this mixture was allowed to polymerize in the constant temperature bath at 200° for 48 hours, it produced a brown viscous polymer, [n]=0.10 at 25° in chloroform. There was no observable volume change during this polymerization process.

EXAMPLE 3, 4, 5

Polymerization of the spiro orthocarbonate: Bis(1,3-propylene) orthocarbonate was synthesized by the method of S. Sakai, et al., [Journal of Organic Chem., 36, 1176 (1971)] and purified by sublimation in two steps, to give material, m.p. 137°–140° (reported 132°–133°). The following reaction was repeated in a constant temperature both at 25°, 100°, and 142°. Into a polymerization tube equipped with a stirring bar was charged 0.73 g of bis(1,3-propylene) orthocarbonate and placed in the constant temperature bath. Then 20 μl of $BF_3.\epsilon t_2O$ was injected into the molten monomer and the contents were mixed. The polymerization was carried out for 7.5 hours in the constant temperature bath. At the last stage of the polymerization the stirring bar began to move and no monomer solidified when the tube was cooled to room temperature. No monomer was detected by nmr. The final polymer had [n]=0.26 (at 25° in chloroform). The elemental analysis, the infared spectrum and the nmr of the polymer were consistant with the polymer structure. The density of the monomer, the polymer and the expansion found are reported in Table 1.

TABLE 1

| Description | Temp. C.° | Density Monomer | Polymer | Expansion |
| --- | --- | --- | --- | --- |
| crystaline monomer | 25° | 1.30, 1.30, 1.33 | 1.20, 1.21, 1.20 | 9% |
|  | 100° | 1.30 | 1.13, 1.15 | 14% |
| amorphous monomer | 142° | 1.12, 1.12, 1.13 | 1.10 | 2% |

EXAMPLE 6

Polymerization of the spiro ortho ester: Into a 8.3-ml dilatometer within a constant temperature bath (20°), 8.3 ml of 1,4,5-trioxaspiro[4,4]nonane was placed. Then 0.05 ml of boron trifluoride etherate was injected into the dilatometer and the contents of the dilatometer were mixed. The polymerization was allowed to run for 24 hours in the constant temperature bath (20°). The yellow viscous polymer expanded 0.011 ml (0.14%) during the polymerization step ([n]=0.087, 25° in chloroform). The infrared spectrum was constant with the polymer structure.

I claim:

1. A method of preparing a polymerizate from a monomer which undergoes essentially zero shrinkage or expansion during the formation of said polymerizate which comprises reacting a monomer characterized by two ring nuclei both of which open to form only one new polymer bond, said nuclei being composed solely of carbon and oxygen atoms, in the presence of a polymerization catalyst under polymerization conditions for a period of time sufficient to produce said polymerizate.

2. The method of claim 1 wherein said monomer is a bicyclo spiro ortho ester.

3. The method of claim 1 wherein said monomer is a bicyclo spiro orthocarbonate.

4. The method of claim 1 wherein said monomer is a bicyclic dicyclic ketal lactone.

5. The method of claim 2 wherein said spiro ortho ester is 1,4,5-trioxaspiro[4,4]nonane and said catalyst is boron trifluoride etherate.

6. The method of claim 3 wherein said spiro orthocarbonate is bis(1,3-propylene)orthocarbonate and said catalyst is boron trifluoride etherate.

7. The method of claim 4 wherein said ketal lactone is 8-methyl-2-oxo-hexahydrofuro[2,3b]furan and said catalyst is of the group consisting of sodium metal or boron trifluoride gas.

8. The polymerizate product resulting from the process of claim 1.

9. The polymerizate product resulting from the process of claim 2.

10. The polymerizate product resulting from the process of claim 3.

11. The polymerizate product resulting from the process of claim 4.

12. The polymerizate product resulting from the process of claim 5.

13. The polymerizate product resulting from the process of claim 6.

14. The polymerizate product resulting from the process of claim 7.

15. In a process for producing a polymerizate by the condensation polymerization or addition polymerization of monomer or prepolymer reactant in the presence of a polymerization catalyst therefor, said reactant having the characteristic to undergo shrinkage during the formation of said polymerizate, the improvement which comprises admixing a cyclic monomer with said reactant to form a polymerizate containing said reactant and said cyclic monomer as chemically combined constituents thereof, said polymerizate being characterized by a decrease in the amount of shrinkage during its formation, said cyclic monomer possessing two ring nuclei both of which open during the polymerization reaction to form only one new polymer bond, said nuclei being composed solely of carbon and oxygen atoms.

16. The process of claim 15 wherein the polymerization of the admixture containing said reactant and said cyclic monomer undergoes essentially zero shrinkage or positive expansion during the formation of said polymerizate.

17. The process of claim 15 or 16 wherein said polycyclic monomer is of the group consisting of bicyclo spiro ortho esters, bicyclo spiro orthocarbonates, and bicyclic ketal lactones.

18. The process of claim 17 wherein said cyclo monomer is 1,4,5-trioxaspiro[4,4]nonane.

19. The process of claim 17 wherein said cyclo monomer is bis(1,3-propylene)orthocarbonate.

20. The process of claim 17 wherein said cyclo monomer is 8-methyl-2-oxo-hexahydrofuro[2,3b]furan.

* * * * *